MINIATURE MAGNETIC TAPE RECORDER WITH REMOVABLE TAPE CARTRIDGE

Filed Oct. 10, 1962 4 Sheets-Sheet 1

Jnventor:
GEORG PROBST
By Kelman and Berman
Agents

April 9, 1968 G. PROBST 3,377,437

MINIATURE MAGNETIC TAPE RECORDER WITH REMOVABLE TAPE CARTRIDGE

Filed Oct. 10, 1962 4 Sheets-Sheet 2

Jnventor:
GEORG PROBST
By Kelman and Berman
Agents

MINIATURE MAGNETIC TAPE RECORDER WITH REMOVABLE TAPE CARTRIDGE

Filed Oct. 10, 1962 4 Sheets-Sheet 3

Inventor:
GEORG PROBST
By Kelman and Berman
Agents

MINIATURE MAGNETIC TAPE RECORDER WITH REMOVABLE TAPE CARTRIDGE

Filed Oct. 10, 1962 4 Sheets-Sheet 4

Inventor:
GEORG PROBST
By Kelman and Berman
Agents

United States Patent Office 3,377,437

Patented Apr. 9, 1968

3,377,437

MINIATURE MAGNETIC TAPE RECORDER WITH REMOVABLE TAPE CARTRIDGE

Georg Probst, Munich, Germany, assignor to Firma GATAG Ltd., Zug, Switzerland

Filed Oct. 10, 1962, Ser. No. 229,555
Claims priority, application Germany, Oct. 19, 1961, P 28,058; Feb. 16, 1962, P 30,622
5 Claims. (Cl. 179—100.2)

The present invention relates to magnetic tape recorders, and particularly to a miniature tape recorder having a detachable tape cartridge.

The object of the invention is the provision of an improved cartridge-type tape recorder which is very simple in its construction, can be manufactured readily at low cost, has small bulk and a compact structure, and can be handled easily, even by an unskilled person.

The tape recorder of this invention consists mainly of a casing, a tape cartridge, and of operating elements arranged partly in the casing and partly in the cartridge. The cartridge is of flat elongated shape and has a recess therein which extends inward of a longitudinal edge of the cartridge. The cartridge is formed with two spool chambers at opposite sides of the recess, and has two flat top walls above the chambers. A portion of the casing is shaped for conforming engagement with the recess in the cartridge and has a flat top wall which covers the recess when the casing portion is received in the recess of the cartridge. The width and length of the cartridge are approximately equal to the overall width and length of the casing.

The friction drive for the tape transport is mounted in the aforementioned casing portion and engages the spools in the cartridge in the operative position of the latter. A pressure device is mounted in the cartridge adjacent the recess for pressing a tape which extends between the spools against a magnetic head mounted in the casing portion referred to above.

Other features, additional objects, and many of the attendant advantages of this invention will be readily apparent from the following description of a preferred embodiment when considered with the attached drawing in which.

Figures 3, 4A, 4B:
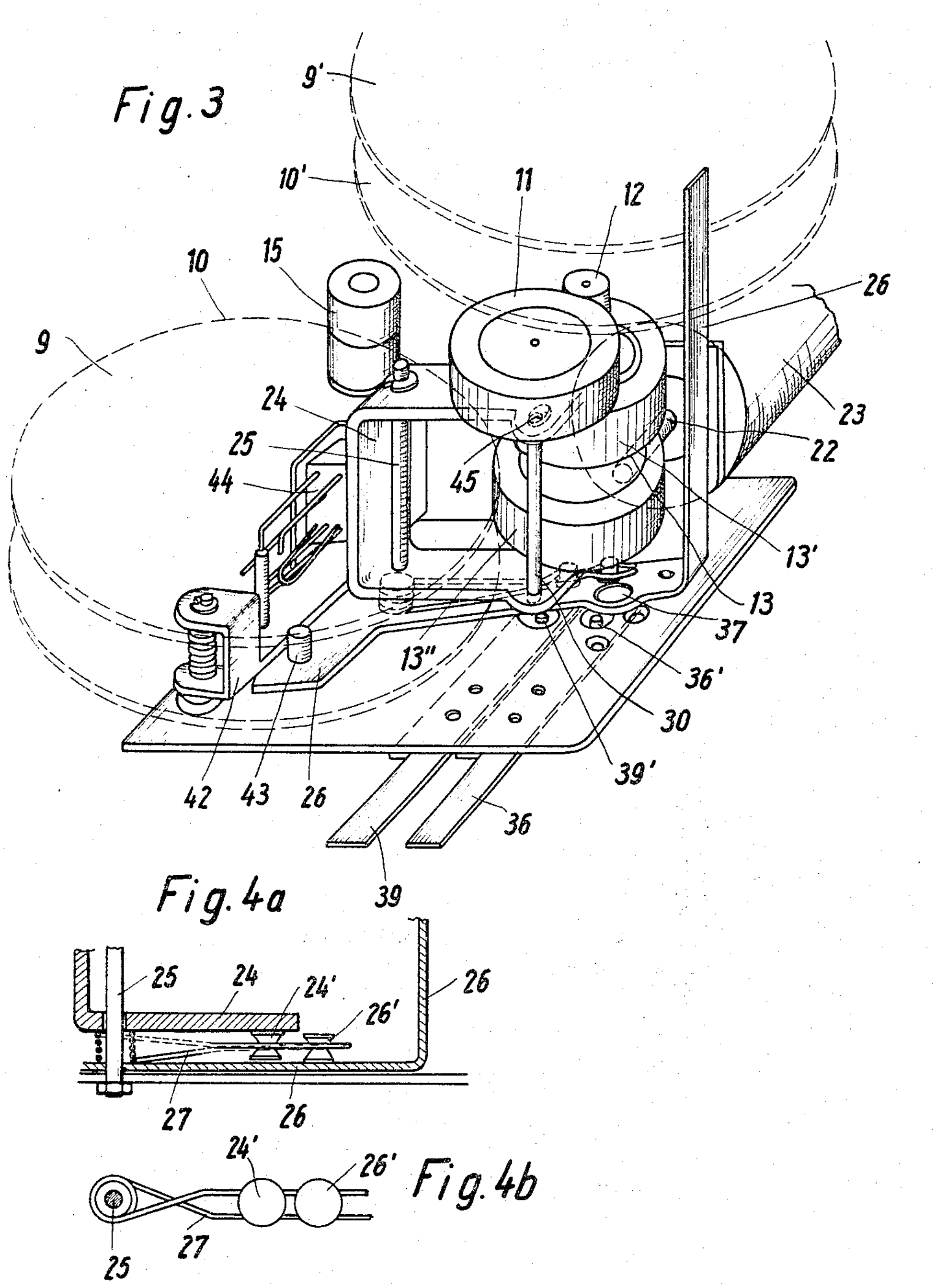
FIG. 3 illustrates the drive mechanism of the recorder in a perspective view.
Figures 5, 6, 7:
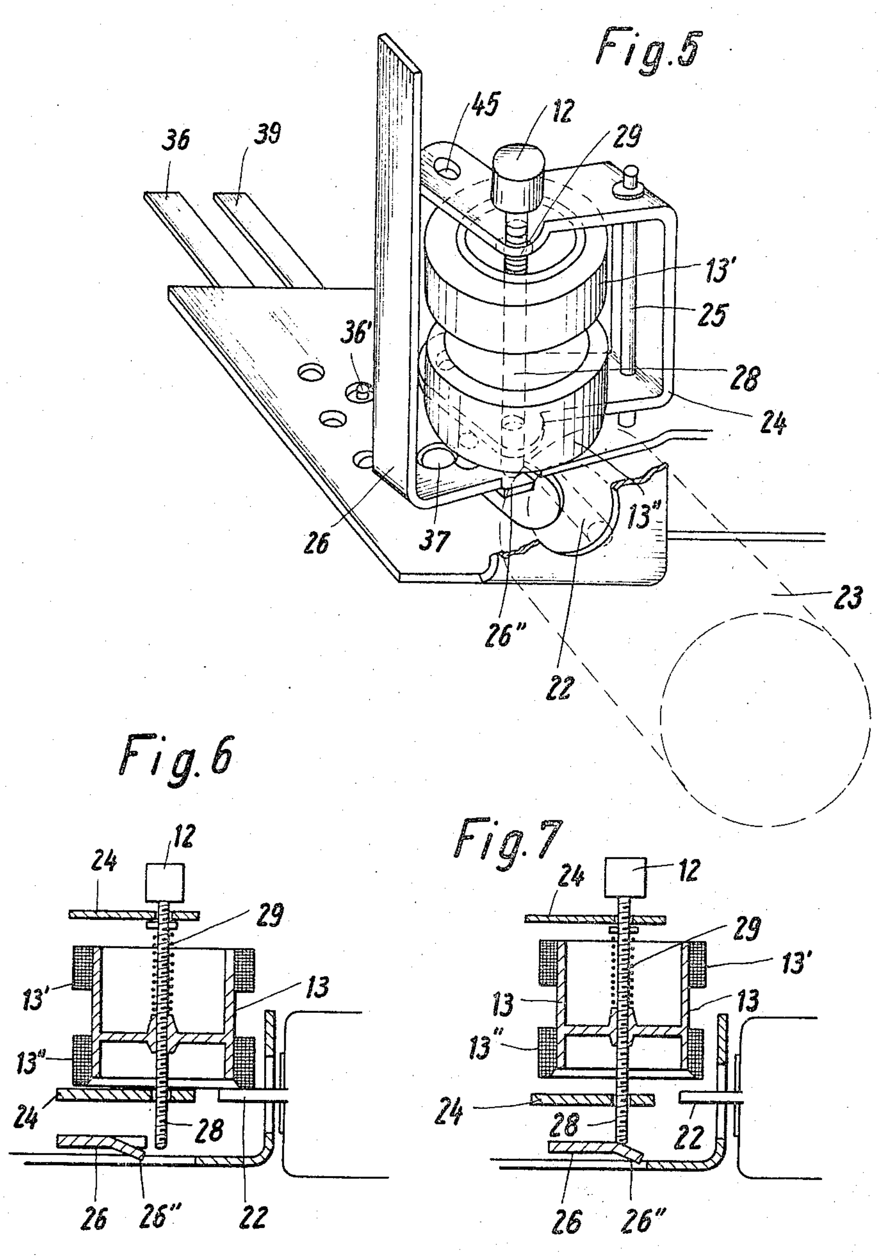
Figure 8:
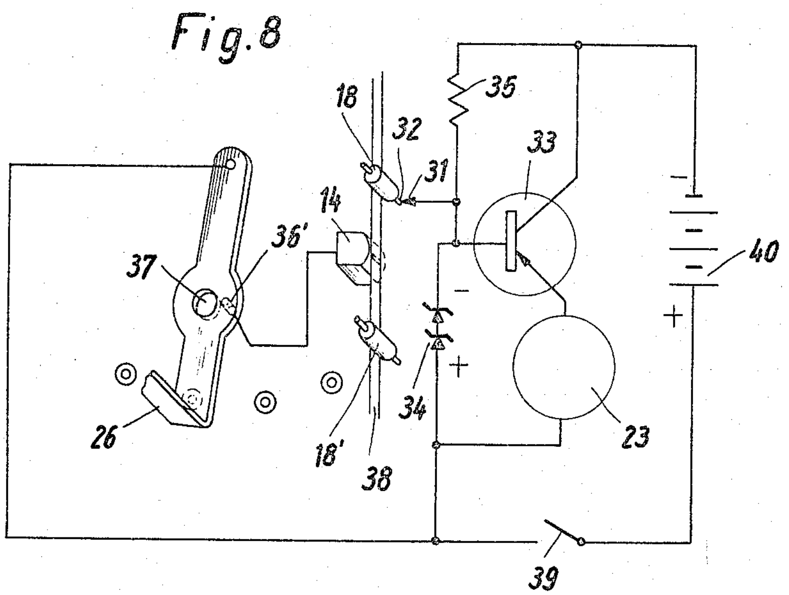
Figure 9:
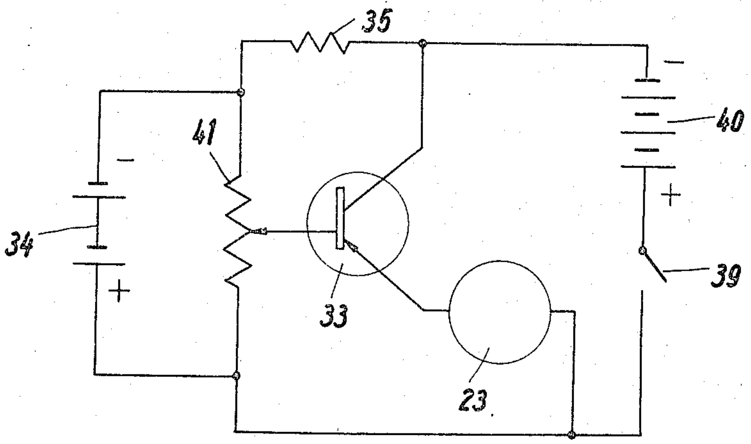

FIGS. 4*a* and 4*b* show a detail of the drive mechanism in side-elevational section and in partly sectional bottom plan view respectively;

FIG. 5 shows the mechanism of FIG. 3 in another perspective view;

FIGS. 6 and 7 show another detail of the drive mechanism in side-elevational section and in two different operating conditions respectively;

FIG. 8 diagrammatically illustrates an electrical circuit for the recorder shown in FIGS. 1 to 7; and FIG. 9 shows a partial modification of the circuit of FIG. 8.

Figures 1, 2:
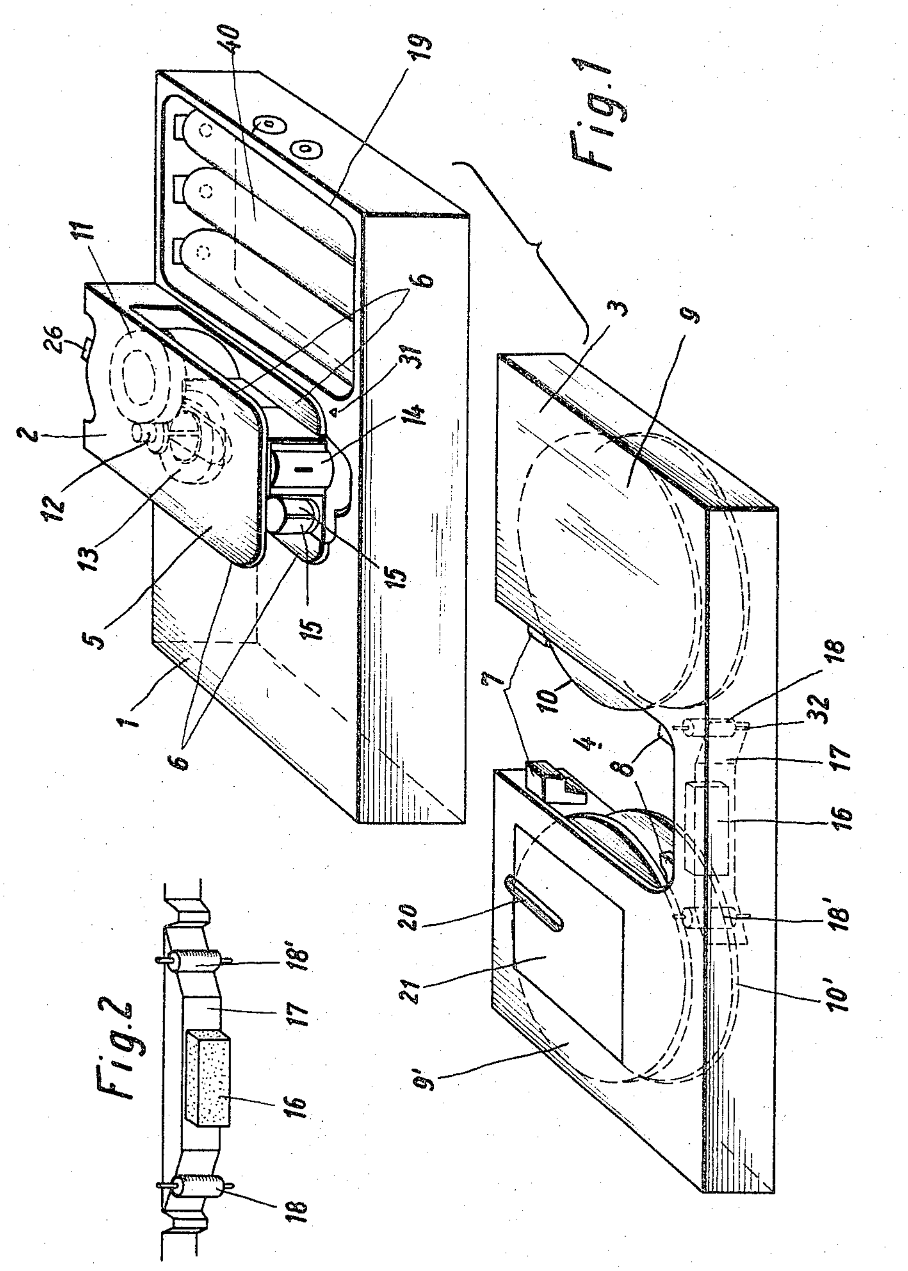
FIG. 1 shows a magnetic tape recorder of the invention and a detached cartridge in a perspective view.
FIG. 2 shows the pressure device of the recorder in perspective view.

In FIG. 1, the lower casing portion 1 of the apparatus is shown to be provided with a central casing portion 2 which upwardly projects from the otherwise flat upper surface of the portion 1 and receives the driving and control elements of the tape spools 9, 9′ of an elongated, flat tape cartridge 3. The casing portion 2 is adapted conformingly to engage a U-shaped central recess 4 in a longitudinal edge of the tape cartridge 3, and the top wall 5 of the casing portion 2 extends over the recess 4 of the engaged cartridge 3. Guide edges 6 on the casing portions 1, 2 facilitate sliding of the cartridge into and out of its operating position transversely of its direction of elongation.

The cartridge 3 is also provided with resilient guiding and stopping projections 7, 8 which abuttingly engage the casing portions 1, 2 to maintain the cartridge 3 in its operating position.

The cartridge 3 as well as the lower casing portion 1 are box-like, have the same overall length and width, and are symmetrically arranged relative to the central projecting casing portion 2 and the recess 4 respectively. Two chambers of the cartridge 3 hold rotatable tape spools 9, 9′ equipped, with double flanges 10, 10′ on stationary, symmetrically arranged, parallel shafts.

The flange 10 of the tape spool 9 normally engages a friction wheel 11 disposed on a shaft 30 within the casing portion 2. The circumferential rubber facing of the wheel 11 can be driven by a friction roller 12.

The friction roller 12 is fixedly fastened to a shaft 28 which also carries a wheel 13 having two circumferential rubber facings. The shafts 30, 28 are supported on a rocker 24 in such a manner that the wheel 11 is normally in driving contact with the upper flange 10 of the tape spool 9, but may be lifted from the flange 10 during rewinding, while the wheel 13 is urged against the lower flange 10′ of the tape spool 9′ to drive the latter.

A rim of the casing portion 2 carries a fixed, magnetic recording and play-back head 14 and an erasing head 15 which can be advanced from a retracted position to a position of engagement with the magnetic recording tape in the cartridge 3.

The magnetic tape has been omitted from FIGS. 1 to 7 for the sake of clarity. It is urged against the head 14 during play-back by means of a pressure assembly arranged in a portion of the cartridge 3 which connects the aforementioned chambers. As seen in FIG. 2, the pressure assembly includes a felt strip 16 mounted on a spring 17 and guide rollers 18, 18′ at either end of the felt strip 16. It also urges the tape against the erasing head 15 during recording.

The rollers 18, 18′ support the spring 17 and make contact with a metallized portion of the tape for switching the recorder off, as will be described hereinbelow.

The recorder is operated mainly by means of dry cells 40 as a source of direct current which are received in a chamber 19 in the casing portion 1 normally covered by the cartridge 3.

One of the two flat top walls of the cartridge 3 laterally adjacent the recess 4 has an observation slot or window 20 for viewing the magnetic tape reeled on the underlying tape spool. A surface portion 21 of the flat wall near the slot 20 is roughened so that it will take pencil writing and like marks.

The drive mechanism for the tape spools 9, 9′ is shown in FIG. 3 on a larger scale than that of FIG. 1. During recording or play-back, the flange 10 of the tape spool 9 is driven by the wheel 11 which engages the friction roller 12 on a common shaft with the driving wheel 13 used for rewinding the tape. During rewinding, a peripheral rubber facing 13′ on the wheel 13 engages a flange 10′ of the spool 9′. A radial face of another rubber facing 13″ of the wheel 13 is in driving engagement with the shaft 22 of an electric motor 23.

The rocker 24 which supports the shafts 30, 28 is pivotally mounted in the casing on a pin 25 on which a manual control lever 26 is also pivoted. As seen in FIG. 1, the lever 26 projects from the casing portion 2 in a direction outward of the recess 4 in the assembled condition of the apparatus. The rocker 24 and lever 26 are connected with each other by a tension spring 27 coiled about the pin 25 and having free radical end portions which abuttingly engage stops 24', 26' on the rocker 24 and the lever 26 respectively. The lever 26 may be shifted between four operating positions: (1) "off," (2) "rewind," (3) "play-back," and (4) "recording."

In the "off" and "rewind" positions of the lever 26, the wheel 13 engages the flange 10' of the spool 9', whereas in the "play-back" and "recording" positions, the wheel 11 is in driving contact with the tape spool 9. Because of the yieldably resilient connection between the lever 26 and the rocker 24 by the spring 27, the pressure of the driving friction wheels on the flanges of the tape spools is constant.

FIGS. 6 and 7 show how the facing 13'' of the wheel 13 may be lifted from the motor shaft 22. The control lever 26 has an upwardly sloping cam surface 26'' by means of which the shaft 28 of the wheel 13 may be lifted against the restraint of a biasing spring 29 which normally urges the facing 13'' toward the shaft 22.

The rocker 24 has an oblong opening 45 in which the shaft 30 of the friction wheel 11 is guided. When the lever 26 is shifted to the "off" or "rewind" positions (FIG. 3), the driving contact between the wheel 11 and the roller 12 is lost, whereby the motion transmitting train between the wheel 11 and the flange 10 is interrupted.

As is seen in FIG. 3, the erasing head 15 is fastened to a lever 42 which is moved by a cam-like projection 43 on the control lever 26 into a position in which the erasing head 15 engages the magnetic tape ahead of the recording head 14 when the lever 26 is set for "recording." The lever 42 acts also upon a change-over lever 44 which shifts the apparatus from "recording" to "play-back."

FIG. 8 is the circuit diagram of the tape transport in the recorder of FIGS. 1 to 7. When the cartridge 3 is assembled with the recorder casing, a contact pin 31 (FIG. 1) on the casing touches one end 32 of the guide roller 18, and a contact 36' on a switching spring 36 (FIG. 3) is closed. When the metallized end of a magnetic tape 38 electrically connects the roller 18 with the magnetic head 14, the base of a transistor 33 is connected by the lever 26 with the positive pole of a current source 40. The transistor thereby becomes non-conductive, and the motor 23, in the emitter circuit of the transistor is deenergized and stops.

If the cartridge 3 is then withdrawn from the recorder casing, reversed, and again inserted on the casing, the guide roller 18' touches the contact pin 31.

When the control lever 26 is between the "play-back" and "rewind" position, the contact 36' is received in a hole 37 of the lever 26 so that the aforementioned circuit is interrupted, whereby the motor 23 may start and resume transporting the tape 38. The metalized tape end is thereby withdrawn from the position in which it connects the guide roller 18 with the magnetic head 14.

FIG. 8 also shows Zener diodes 34 energized through a resistor 35 which hold the voltage applied to the motor 23 at a constant voltage independent from the output voltage of the battery 40 within obvious limits. A switch 39 permits the recorder to be shut off when the lever 26 is in its disengagement position.

The modified circuit partly illustrated in FIG. 9 includes a potentiometer 41 for controlling the tape speed by varying the voltage applied to the motor 23. The circuit is otherwise substantially identical with that of FIG. 8, and the same reference numerals refer to the same elements.

What I claim is:

1. In a portable miniaturized magnetic tape recording and playback apparatus, in combination:

(a) a casing;

(b) a detachable tape cartridge of flat, elongated shape formed with a recess therein extending inward of a longitudinal edge portion of said cartridge, (1) the cartridge being formed with two spool chambers at opposite sides of said recess and having two flat top walls above said chambers respectively, (2) a portion of said casing being shaped for conforming engagement with said recess, (3) said casing portion having a flat top wall covering said recess when the casing portion is received in the same, (4) the width and length of said cartridge being substantially equal to the overall width and length of said casing thereby affording maximum tape storage space;

(c) two spools respectively arranged in said chambers for rotation about parallel axes;

(d) friction drive means mounted in said portion of the casing for engagements with said spools when the portion of the casing is received in said recess, said friction drive means including a control lever projecting from said portion of the casing in a direction outward of said recess when said portion is received in the recess, and motion transmitting means responsive to movement of said lever transversely of said axes for moving the friction drive means from a position of engagement with one of said spools to a position of engagement with the other spool;

(e) a magnetic head in said portion of the casing; and (f) pressure means on said cartridge adjacent said recess for pressing a tape extending in said cartridge between said spools against said head in the casing portion.

2. In an apparatus as set forth in claim 1, guide means on said casing for guiding said casing portion inward and outward of said recess in the direction of the widths of said casing and of said cartridge, said cartridge and casing being so designed that assembly is accomplished by sliding the cartridge into engagement with said portion of the casing in a plane parallel to the top wall of said casing, whereby inadvertent injury to the tape, magnetic head and friction drive means is prevented.

3. In an apparatus as set forth in claim 1, each spool having a flange, and said friction drive means including a plurality of friction wheels respectively engaging the flanges of said spools in said positions of engagement.

4. In an apparatus as set forth in claim 1, said pressure means including a spring mounted in said cartridge, and a felt member mounted on said spring.

5. In an apparatus as set forth in claim 4, a plurality of guide means spaced along said spring in a direction from one of said spools toward the other spool for guiding said tape during movement thereof between said spools.

References Cited

UNITED STATES PATENTS

| | | | |
|---|---|---|---|
| 2,609,457 | 9/1952 | Thurm | 242—55.12 |
| 2,914,620 | 11/1959 | Dale | 179—100.2 |
| 2,962,239 | 11/1960 | Loewe et al. | 242—55.12 |
| 3,006,566 | 10/1961 | Loewe | 242—55.12 |
| 3,008,012 | 11/1961 | Proctor | 179—100.2 |
| 3,125,645 | 3/1964 | Cech | 179—100.2 |
| 3,130,934 | 4/1964 | Richt | 242—55.12 |
| 3,133,710 | 5/1964 | Herterich | 242—55.12 |
| 3,177,768 | 4/1965 | Hallamore | 179—100.2 |

BERNARD KONICK, *Primary Examiner.*

J. R. GOUDEAU, P. ROTH, *Assistant Examiners.*